March 1, 1949.　　　　　J. M. KEMPER　　　　　2,463,490
CABIN PRESSURE CONTROL SYSTEM
Filed Oct. 29, 1945　　　　　　　　　　　　　　3 Sheets-Sheet 1

INVENTOR.
JAMES M. KEMPER
BY
ATTORNEY

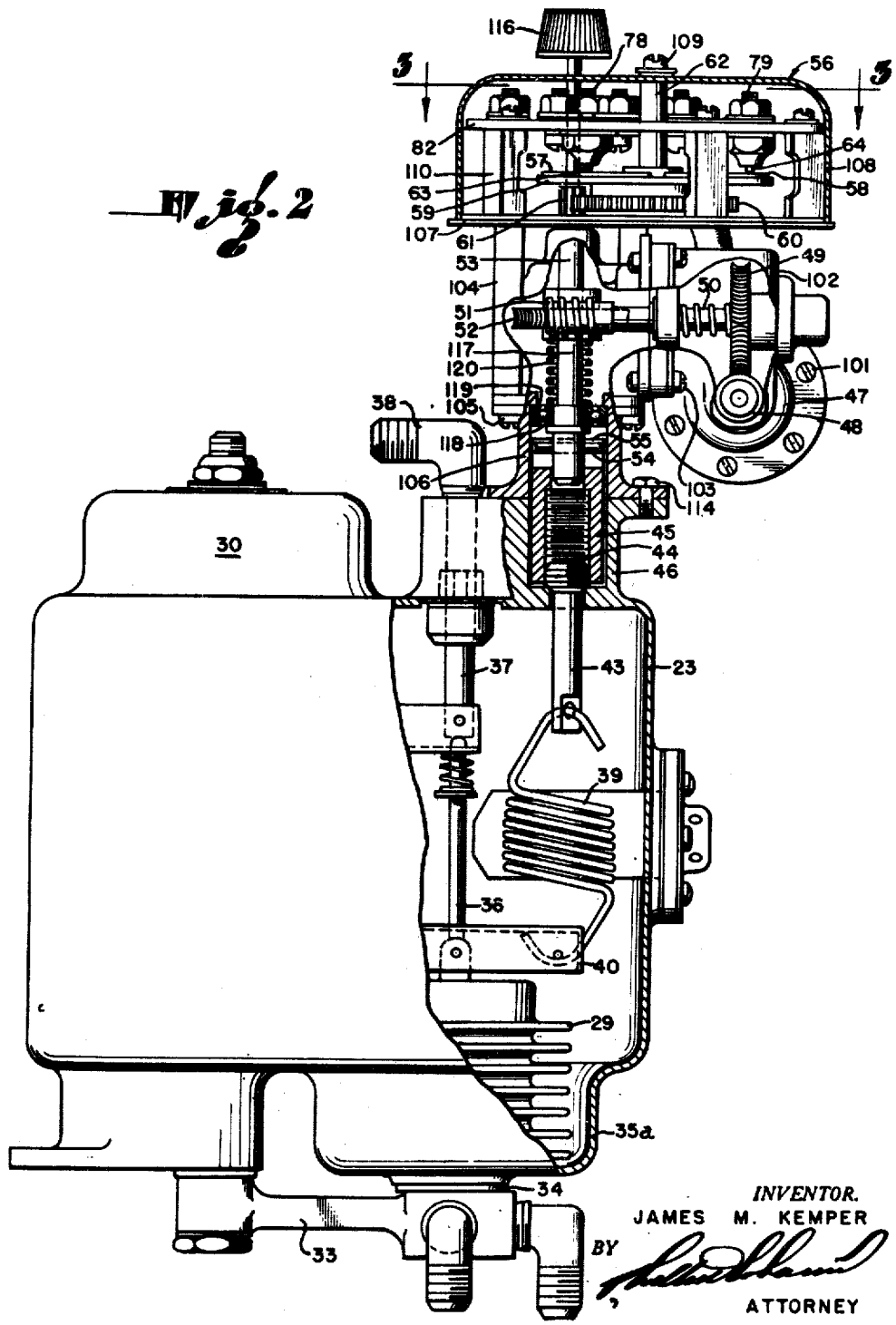

March 1, 1949.　　　　J. M. KEMPER　　　　2,463,490
CABIN PRESSURE CONTROL SYSTEM
Filed Oct. 29, 1945　　　　　　　　　　　　3 Sheets-Sheet 3
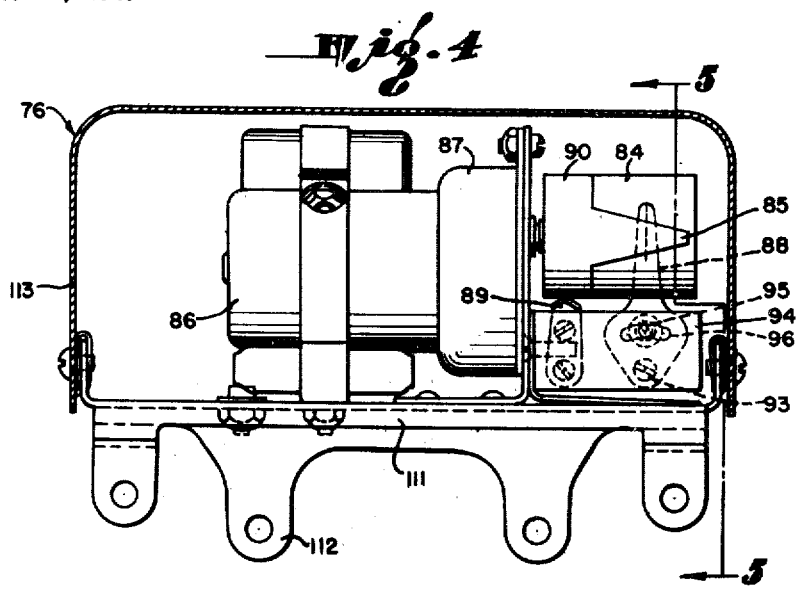
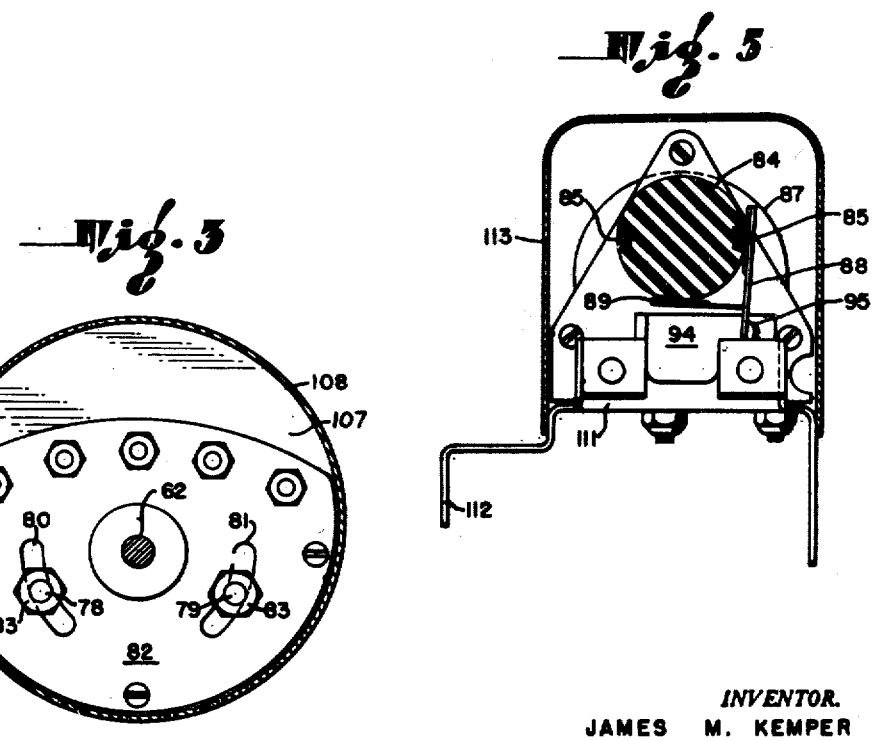
INVENTOR.
JAMES M. KEMPER
BY
ATTORNEY Patented Mar. 1, 1949

2,463,490

UNITED STATES PATENT OFFICE 2,463,490

CABIN PRESSURE CONTROL SYSTEM

James M. Kemper, Los Angeles, Calif., assignor to The Garrett Corporation, Airesearch Manufacturing Company division, Los Angeles, Calif.

Application October 29, 1945, Serial No. 625,379

26 Claims. (Cl. 98—1.5)

This invention relates to apparatus for controlling the ventilation, under pressure, of the atmosphere within an enclosure such as an aircraft cabin. It is particularly applicable to military aircraft, in which a number of serious problems are met with in the event of a major perforation of the wall of a pressurized cabin during combat operations. If the area of perforation is sufficiently large, the air will escape from the cabin faster than the supercharging apparatus can pump fresh air into the cabin to replace it. Consequently, cabin pressure may drop to a low level at a rate greater than that at which the occupants can continue to maintain normal and rational bodily and mental functioning.

The problems of maintaining rational functioning of the military personnel of a combat plane under such conditions can be partially solved by providing equipment for the controlled supply of breathing oxygen, and such equipment is available. Thus, a plane may continue to operate at altitudes above the limits where ambient atmosphere is capable of furnishing an adequate oxygen supply for breathing purposes. However, such equipment does not completely solve the problems mentioned above. The seriousness of these problems is proportional to the magnitude of the differential between cabin and ambient atmospheric pressure for which the pressure regulating apparatus is set to operate at the higher altitudes. Consequently, these problems may be dealt with by providing for use in conjunction with the oxygen apparatus, means for reducing the differential during combat operations, and the general object of the present invention is to provide a pressure regulating mechanism including means whereby the differential between cabin and ambient atmosphere pressure normally called for at high altitudes may be temporarily reduced, for combat operations, to a predetermined minimum and may subsequently be restored to its normally high level.

A further object of the invention is to provide a pressure regulating system incorporating a differential changer, the operation of which may be initiated manually by the pilot, and which is then adapted to automatically change the differential from a predetermined high limit to a predetermined low limit, or vice versa, depending upon the direction in which the manual control is set for operation.

When a plane enters combat, it is desirable that the change from high to low differential be brought about with moderate rapidity, in order that the low differential may be arrived at before the plane actually becomes subject to possible perforations from enemy fire. Should the wall of the cabin be ruptured to an extent such as to cause substantially instantaneous decompression (commonly referred to as explosive decompression), the effect upon the occupants would be injurious to an extent proportional to the altitude of the plane, and, at extremely high altitudes, could be fatal. Accordingly, the invention contemplates the controlled reduction of differential at a rate of maximum rapidity consistent with the avoidance of injurious consequences.

Excessive rapidity of increase in differential also produces deleterious effects upon the personnel of the plane. Too rapid an increase in cabin pressure can seriously affect the middle ear of an occupant. A further object of the invention, therefore, is to provide a cabin pressure regulating system capable of effecting a considerably slower change from low to high differential than the change to low from high differential. The extent of the injurious effect of rapid decompression depends somewhat upon the value of the differential at its lower limit. For this, and other, reasons it is desirable to adjust the value of this limit to meet varying conditions. It is also desirable to adjust the upper or maximum limit to which the differential may be raised—i. e., the normal value of the differential at high altitudes to correspond to the structural load limit of the cabin walls. A further object of the invention is to provide a regulator which, in addition to the above described features, permits the adjustment of both the upper and lower limits of the differential.

Another object of the invention is to provide a differential changing control which is adapted to override a control which normally operates to maintain a fixed (normal) differential between cabin and ambient atmospheric pressures in at least one stage of operation of the regulating system. Thus the regulator would normally maintain a maximum differential in this stage of operation, but would be adapted, under manual control, to shift from high to low and back to high differential while operating under external atmospheric conditions normally calling for high differential.

The invention is particularly applicable to a commonly used method of pressurizing in which cabin pressure is permitted to remain substantially the same as atmospheric pressure until a predetermined altitude has been reached, is maintained at a substantially constant level between that altitude and a second predetermined and higher altitude, and, above said second predetermined altitude, is maintained at a substantially fixed normal differential relative to external atmosphere. In actual operation in such a system, the differential changer will override not only the normal differential control, but also the isobaric control in that portion of the isobaric range wherein there is developed a differential of cabin over ambient atmospheric pressure exceeding the minimum differential limit determined by the differential changer of the present invention.

Another object of the invention is to provide differential changing control mechanism which is capable of being adjusted to various rates of differential change in the differential increasing operations in order that these changes may be adjusted to best meet the requirements of varying general conditions of operation.

Another object is to provide a pressure regulating system embodying a differential pressure control provided with differential changing mechanism utilizing a single reversible electric motor for rapidly changing the differential from high to low and for slowly changing the differential from low to high.

Another object of the invention is to provide a pressure regulating system which, in addition to the features described above, is incorporated in a pressure regulator which is of relatively simple and inexpensive construction, is very small and light in weight so as to add little to the weight of the plane in which it is installed; is dependable in operation irrespective of its position with reference to the horizontal; may be in the form of a self-contained unit capable of being furnished as a packaged article; is not affected by dirt, oil, water, or moisture; and has few close tolerances requiring precise machining operations.

Further objects and advantages of the invention will be brought out in the following part of the specification.

Referring to the drawings which are for illustrative purposes only,

Fig. 2 is an elevation of the regulator, partially in section;

Fig. 3 is a detailed sectional view taken on the line 3—3 of Fig. 2;

Fig. 4 is a detail of the timer for the low to high adjustment, with one side of the case thereof removed; and Fig. 5 is a detail transverse sectional view of the timer, taken on the line 5—5 of Fig. 4.

Figure 1:
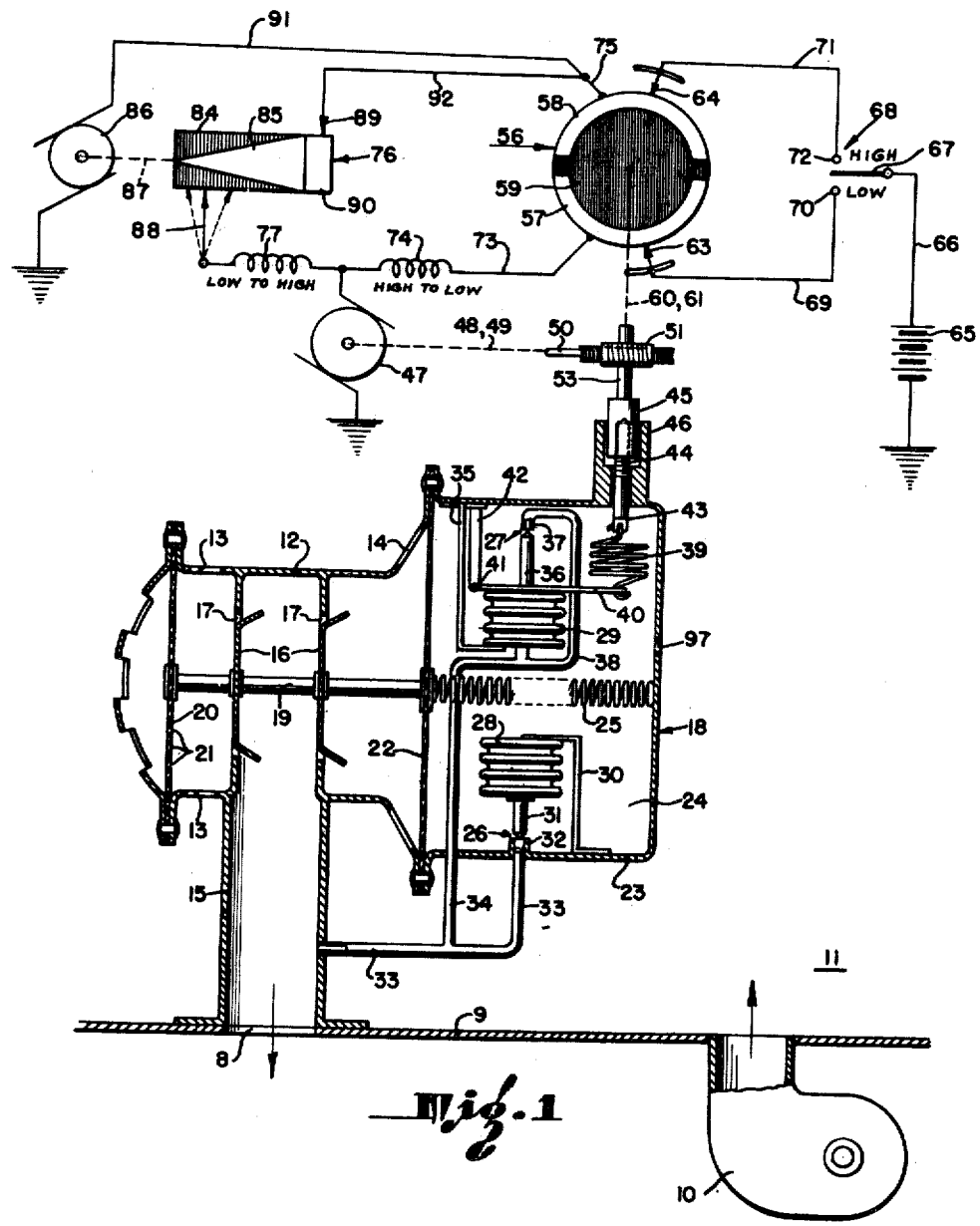
Figure 1 is a schematic showing of a regulator embodying the invention, including a wiring diagram of the electric circuit thereof.

As an example of a system embodying the invention, I have shown in Fig. 1 a schematic representation of a regulator adapted to control the outflow, through an outlet 8, in the wall 9 of an aircraft cabin, of air which is pumped into the cabin under pressure by suitable supercharging apparatus 10, or by a ram. The regulator is adapted to be disposed within the cabin atmosphere 11, and embodies generally a valve casing 12 into which cabin air flows through openings 13, 14, an outlet duct 15 for discharging such air to the cabin outlet 8, a pair of valve elements 16 controlling valve apertures 17, through which the air may flow from the valve casing 12 to the duct 15, and control mechanism, indicated generally at 18.

The valves 16 are carried by a shaft 19 which is supported between a flexible support member 20 (comprising one or more spiral shaped webs separated by slots 21) and a diaphragm 22. The diaphragm 22 is clamped to one end of the casing 12 by a casing section 23 which cooperates therewith to define a control chamber 24 in which is maintained a pressure which is normally a trifle lower than the pressure in the cabin. The pressure in the control chamber 24 is such that the resultant force against the diaphragm 22 plus the force of a spring 25 equals the force resulting from cabin pressure against the other side of the diaphragm 22. The diaphragm 22 responds to differentials arising between cabin pressure exerted against its left side (as viewed in Fig. 1) and the pressure of the air in the control chamber 24, supplemented by the force of the spring 25, exerted against its right side. Any tendency of cabin pressure to drop below the level determined by the pressure in the control chamber 24 will result in movement of the diaphragm 22 in valve closing direction, thus causing the cabin pressure to rise to the proper level. Conversely, any excess of cabin pressure will result in valve opening movement, permitting cabin pressure to drop back to the level determined by pressure in the control chamber 24.

The pressure in the control chamber 24 is controlled by pilot valves 26 and 27 adapted to bleed excess pressure from the chamber 24 in accordance with the response of a pair of pressure responsive elements 28 and 29 to the pressure to which they are subjected.

The pressure responsive element 28 comprises a sealed bellows which is responsive to the absolute pressure existing in the chamber 24. One end of the bellows is anchored to the casing 23 as indicated at 30, and the other end carries a valve needle 31 cooperable with an outlet 32 leading through a tube 33 to the duct 15 and thus in communication with ambient atmospheric pressure level. The pressure sensitive element 29 is exteriorly subject to the pressure of the chamber 24 and interiorly connected to the duct 15, and thus to ambient atmospheric pressure level by a tube 34. Thus it is responsive to the differential between ambient atmospheric pressure and the pressure in the chamber 24. One end of the pressure responsive element 29 is anchored to the casing 23 by a suitable bracket 35 which, as shown in Fig. 2, may be in the form of a cup 35a in the wall of the casing. The other end carries a valve needle 36 cooperable with an outlet 37 communicating through a tube 38 with the duct 15 and thus with ambient atmosphere. This other end of the pressure responsive element 29 is also subject to the variable pull of a spring 39 exerted through a lever 40 attached to the movable end of the pressure responsive element 29 and pivoted at 41 to a bracket 42.

By adjusting the tension on the spring 39, it is possible to change the differential which the valve 27 will maintain between cabin pressure and ambient atmospheric pressure. The present invention provides mechanism for automatically changing the tension on the spring 39, such mechanism comprising a rod 43, into one end of which the spring 39 is hooked, the other end of the rod 43 having a threaded head 44 threaded into an interiorly threaded sleeve 45 which is rotatively mounted in a socket 46 in the control casing 23. (See Fig. 2 for detailed construction.) Rotational movement is imparted to the sleeve 45 by a reversible motor 47 driving through a double reduction drive including a worm 48 on the shaft of the motor 47, a worm wheel 49 on a shaft 50, a worm 51 on the shaft 50, the worm wheel 52 meshing with the worm 51, and a shaft 53 on which the worm wheel 52 is mounted and which has at its lower end a drive pin 54 drivingly engaged in the slot 55 in the upper end of the sleeve 45.

The extent to which the tension of the spring 39 is varied depends upon the extent of operation of the motor, which in turn is controlled by a limit switch indicated generally at 56. The limit switch (Fig. 2) comprises a pair of semicircular contact segments 57 and 58 mounted on a disc 59 of insulating material which is rotated by the motor 47 through the shaft 53 and a gear 60 with which a pinion 61 on the upper end of the shaft 53 meshes. The disc 59 is directly attached to the gear 60 and the two are mounted for rotation on a post 62.

The segments 57 and 58 are contacted respectively by brushes 63 and 64. Current from a battery, or other source of power 65, transmitted through a conductor 66 to the double throw switch arm 67 of a two-way switch 68, may be directed to the brush 63 through a conductor 69 by moving the switch arm 67 into engagement with the switch contact 70, and may be directed through a conductor 71 to the brush 64 by moving the switch arm 67 into engagement with the switch contact 72.

Engagement of the contact 70 establishes a circuit through the segment 57 and a conductor 73 attached thereto to the "high to low" winding 74 of the reversible motor 47, causing the motor 47 to operate in the direction for moving the shaft 43 inwardly with reference to the control casing 23, thus relaxing the tension on the spring 39. At the same time, the disc 59 will be rotated in clockwise direction until it moves the segment 57 out from under the brush 63, thus breaking the circuit to the winding 74, and stopping the motor 47. It may be noted at this point that the brushes 63 and 64 subtend an angle with reference to the axis of rotation of the disc 59 which departs sufficiently from 180° so that when the segment 57 leaves the brush 63, the brush 64 will remain in engagement with the segment 58 and vice versa.

When the switch arm 67 is moved to the contact 72, a circuit will be established through the segment 58, a conductor 75 attached thereto, the timer 76 (which will be described in detail later) and the "low to high" winding 77 of the motor 47, causing the latter to operate in a direction to draw the rod 43 outwardly, increase the tension of the spring 39, and thereby increase the pressure differential. In this case, the operation of the motor 47 will be stopped when the segment 58, now rotating counterclockwise, moves out from under the brush 64, leaving the brush 63 in contact with the segment 57.

The extent of differential change is determined by adjustment of the brushes 63 and 64. Referring now to Figs. 2 and 3, the brushes 63 and 64 are mounted in studs 78 and 79 respectively which in turn are extended through slots 80 and 81 respectively in a disc 82 and are clamped to the disc 82 by nuts 83 threaded on the studs 78 and 79. Adjustment of the brush 63 determines the limit at which relieving the tension of the spring 39 is terminated and thus determines the lower limit of pressure differential. Similarly, the position of adjustment of the brush 64 determines the point at which increasing the tension of the spring 39 is terminated and thus determines the upper limit of pressure differential arrived at in the automatic change.

The rate of change from low to high differential is controlled by the timer 76 which provides for intermittently making and breaking the circuit to the reversible motor winding 77. The timer 76 comprises a drum 84 which carries one or more contact segments 85 of constantly varying breadth from end to end, a motor 86 for driving the drum 84 through reduction gearing 87, a brush 88 alternately engaging the insulating surface of the drum 84 and contacting surface of the segment 85 as the drum 84 rotates, and a brush 89 constantly engaging a contact ring 90 to which one end of each segment 85 is attached. The brush 89 receives the current from the conductor 75 through a conductor 92.

The motor 86 is energized through the segment 58, conductor 75 and a conductor 91; thus, the motor 86 continues to rotate as long as the brush 64 is in contact with the segment 58, and stops when the segment 58 leaves the brush 64. During this overall period of low to high operation, the circuit through the motor 47, will be alternately made and broken by the intermittent contact of the brush 88 with the segment 85. The ratio between the "on" and "off" periods is determined by the setting of the brush 88 which is adjustable longitudinally of the drum 84. Such adjustment may be provided for by pivoting the lower end of the brush 88, as at 93, to a bracket 94 and clamping an intermediate region of the brush 88 to the bracket 94 in various positions by means of a clamp screw 95 extending through an arcuate slot 96 in the brush 88 and threaded into the bracket 94.

In the operation of the regulator, the diaphragm 22 will constantly function to sense any fluctuation in cabin pressure above or below a selected pressure determined by the pressure in the control chamber 24 and by the operation of the pilot valves 26 and 27 to determine such control chamber pressure. Whenever cabin pressure tends to increase above the selected pressure level, the diaphragm 22 will respond by moving rightwardly against the yielding resistance of the spring 25 and the air cushion in the chamber 24. Such rightward movement will open the valve 16 to increase the outflow from the cabin and permit cabin pressure to drop back to the selected level, whereupon the diaphragm 22 will return to a position in which the valves 16 will be positioned for maintaining the selected pressure in the cabin. Conversely, any tendency of cabin pressure to drop below the selected level will be immediately sensed by the diaphragm 22, which will respond by moving leftwardly to close the valve 16 and throttle the outflow from the cabin so as to permit cabin pressure to build up to the selected level. The movement of the valve element 16 will be dampened by the dash pot action of air flowing into the chamber 24 through the restricted aperture 97 in response to diaphragm movement. Such dampening tends to avoid hunting and is a desirable characteristic.

The pressure in the control chamber 24 is regulated as follows. Air pumped into the cabin will bleed through the restricted aperture 97 into the control chamber 24. A slight head of pressure in the cabin over the pressure in the chamber 24 will normally be maintained in order to induce such inflow into the chamber 24. The air entering the chamber 24 is bled off through the valve 26 or the valve 27 and thus the pressure in the control chamber is controlled.

Within the lower altitude range, the absolute pressure responsive aneroid 29 will maintain the valve 26 open and permit air to escape from the chamber 24 as rapidly as it enters through the orifice 97, thereby substantially equalizing the pressure in the chamber 24 with ambient atmospheric pressure and consequently maintaining cabin pressure at substantially ambient atmospheric level. When the plane, in its ascent, approaches the altitude beginning the second range of operations, the pressure in the chamber 24 which has previously maintained the aneroid 29 sufficiently collapsed to hold the valve 26 open, will be reduced sufficiently to permit the aneroid 29 to expand so as to partially close the valve 26, thus restricting the escape of air from the chamber 24 (the valve 27 being already closed). The pressure in the chamber 24 will then be at a value slightly less than cabin pressure and will thereafter remain substantially at the level determined by the closing of the valve 26, thus maintaining a substantially fixed cabin pressure throughout the second, or isobaric, range of operations.

When the plane ascends to an altitude corresponding to the lower limit of the range of differential pressure control, the pressure within the pressure responsive element 29, constantly dropping in step with the reduction of ambient atmospheric pressure, will be overcome by the pressure in the chamber 24 sufficiently to overcome the pull of the spring 39 and thereby open the valve 27. Thereafter the valve 27 will permit just enough air to escape from the chamber 24 to maintain therein a fixed differential over ambient atmospheric pressure, and a corresponding pressure will be maintained in the cabin.

If the tension of the spring 39 is lowered, it will take less differential of pressure in the chamber 24 over ambient atmospheric pressure to collapse the pressure responsive element 29 sufficiently to open the valve 27, and the differential between cabin pressure and ambient atmospheric pressure will be correspondingly lowered. Conversely, if the tension of the spring 39 is increased, it will take a greater differential of pressure on the chamber 24 over ambient atmospheric pressure to open the valve 27, and a correspondingly greater differential in cabin pressure over ambient atmospheric pressure will be maintained.

Assuming that the plane has reached a high altitude, well above the lower limit of the normal range of differential operations, while the system has been set for high differential operation, a subsequent change to low differential will have the effect of lowering the pressure within the cabin until the difference between cabin pressure and ambient atmospheric pressure is the low differential determined by the setting of the brush 63. A subsequent change back to high differential will have the effect of raising the pressure within the cabin (at a rate determined by the setting of the brush 88 of the timer 76) until the difference between cabin pressure and ambient atmospheric pressure is the high differential determined by the setting of the brush 64.

Referring now to details of construction of the regulator which have not been previously mentioned, it may be noted that the motor 47 is attached, by means of screws 101, to the gear case 102 of the primary gear set, the case 102 being attached by screws 103 to the case 104 of the second gear set. The case 104 is attached to a collar 106 by screws 105 and the collar 106 is secured to the socket 46 by screws 114.

The various parts of the limit switch 56 are mounted upon a base 107 carried by the upper end of the gear case 104, and are enclosed between the base 107 and a cover 108 held down by a screw 109 threaded into the post 82. The disc 82 is mounted upon posts 110 rising from the base 107.

Means is provided for manually adjusting the tension of the spring 39 in the event of failure of automatic operation. Such means comprises a knob 116 on the end of the shaft 53 (which projects through the cover 108), a sliding bearing engagement of the portion 117 of the shaft 53 in a bushing 118 (constituting the inner race of an anti-friction bearing 119 by means of which the shaft portion 117 is journaled in the collar 106), and a spring 120 interposed between the bushing 118 and the worm gear 52. The spring 120 normally maintains the shaft 53 in a position in which the worm gear 52 is in mesh with the worm 51. By pushing the knob 116 inwardly, the gear 52 may be disengaged from the worm 51, while the pinion 61 remains in mesh with the gear 60, and the pin 54 remains in engagement with the slot 55.

I claim as my invention:

1. Mechanism for controlling the pressure of air in an aircraft cabin, comprising: a valve for controlling cabin pressure; walls defining a control pressure chamber having a bleed connection with a source of higher pressure; differential pressure responsive means responsive to a differential between ambient atmospheric pressure and the pressure in said control chamber for maintaining a pressure in said chamber at a selected differential between the pressure therein and ambient atmospheric pressure; a movable wall controlling said valve and subjected on one side to cabin pressure and subjected on the other side to control chamber pressure; means for adjusting said differential pressure responsive means so as to change the differential between high and low limits; motor operated means for driving said adjusting means; and control means for said driving means providing for rapid operation thereof in the change from high to low differential and delayed operation thereof in the change from low to high differential.

2. Mechanism for controlling the pressure of air in an aircraft cabin, comprising: a valve for controlling cabin pressure; walls forming a control pressure chamber connected with a source of higher pressure, one of said walls being movable and adapted to control said valve, said movable wall being subjected on one side to control chamber pressure and on the other side to cabin pressure; a differential pressure responsive device, responsive to the differential between ambient atmospheric pressure and control chamber pressure for maintaining a pressure in said control chamber which is at a selected differential with respect to ambient atmospheric pressure in at least one stage of operation of the mechanism and thus maintain a pressure in said cabin which is at a corresponding selected pressure differential with respect to said ambient atmospheric pressure; means for effecting adjustment of said differential pressure responsive device so as to change the differential from a high to a low limit and vice versa; a reversible electric motor for driving said adjusting means in opposite directions; means for energizing said motor for uninterrupted operation of said adjusting means from the high to the low differential limit; and means including said energizing means and also including circuit interrupting means, for intermittent energization of said motor for the adjustment from the low to the high differential limit.

3. Mechanism for controlling the pressure of air in an aircraft cabin, comprising: a valve controlling cabin pressure; walls defining a control pressure chamber connected with a source of higher pressure, one of said walls being movable and controlling said valve, said movable wall being subjected on one side to control chamber pressure and on the other side being subjected to cabin pressure; a differential pressure responsive device having a movable part responsive to a differential between ambient atmospheric pressure and control chamber pressure for maintaining a selected differential between control chamber and hence cabin pressure, and ambient atmospheric pressure, in at least one stage of operation of the mechanism; means for adjusting said differential pressure responsive device for changing the differential; a reversible electric motor for driving said adjusting means; a limit switch also driven by said motor and adapted to interrupt the operation thereof at high and low differential limits respectively; means including said limit switch for energizing said motor for uninterrupted operation from high to low differential limits; and means including said limit switch and a circuit interrupter for intermittent and therefore delayed energization of said motor for adjustment from low to high differential.

4. Mechanism for controlling the pressure of air in an aircraft cabin, comprising: a valve for controlling cabin pressure; walls defining a control pressure chamber having a connection with a source of higher pressure, one of said walls being movable and controlling said valve, said movable wall being subjected on opposite sides to control chamber pressure and cabin pressure respectively; a differential pressure responsive device having a movable part responsive to a differential between ambient atmospheric pressure and control chamber pressure for maintaining a selected differential between control chamber pressure and hence cabin pressure, and ambient atmospheric pressure, in at least one stage of operation of the mechanism; means for adjusting said differential pressure responsive device for changing the differential; a reversible electric motor for driving said adjusting means; a limit switch also driven by said motor and adapted to interrupt the operation thereof at high and low differential limits respectively; means including said limit switch for uninterrupted energization of said motor for adjustment from high to low differential; means including said limit switch and circuit interrupting means for intermittent energization of said motor for slower adjustment from low to high differential; and means for adjusting said limit switch in a manner to vary at least one of the differential limits.

5. Mechanism for controlling the pressure of air in an aircraft cabin, comprising: a valve for controlling cabin pressure; walls forming a control pressure chamber having a connection with a source of higher pressure, one of said walls comprising a diaphragm for controlling said valve, said diaphragm being responsive to variations in the differential between the pressure in the control chamber and cabin pressure; a differential pressure responsive device, responsive to a differential between ambient atmospheric pressure and control chamber pressure for maintaining a selected differential between control chamber pressure and hence cabin pressure, and ambient atmospheric pressure, in at least one stage of operation of the mechanism; means for adjusting said differential pressure responsive device for changing the differential; a reversible electric motor for driving said adjusting means; a limit switch also driven by said motor and adapted to interrupt the operation thereof at high and low differential limits respectively; and means for adjusting said limit switch in a manner to vary at least one of the differential limits.

6. Mechanism for controlling the pressure within an aircraft cabin comprising: a valve for controlling the pressure within the cabin; walls forming a control chamber having a bleed connection with a source of higher pressure, one of said walls comprising a diaphragm responding to variations in the differential of pressure between that in the control chamber and the pressure in the cabin, said diaphragm being operable to control said valve; a pressure responsive element for affecting the operation of said valve, said pressure responsive element responding to variations in the differential between control chamber pressure and ambient atmospheric pressure; and means for changing the response of said pressure responsive element, said last means comprising a screw jack, a reversible electric motor for driving said screw jack in opposite directions, and a rotary limit switch connected to said motor and screw jack and functioning to interrupt the operation of said motor at a predetermined limit.

7. Mechanism for controlling the pressure within an aircraft cabin, comprising: a valve for controlling the pressure within the cabin; walls forming a control pressure chamber connected with a source of higher pressure, one of said walls comprising a pressure responsive diaphragm for controlling said valve, said diaphragm operating in response to variations in the pressure differential between control chamber pressure and cabin pressure; a pressure responsive element for controlling the control chamber pressure and thus affecting the operation of said valve, said pressure responsive element responding to the differential between control chamber pressure and ambient atmospheric pressure; means for adjusting the response of said pressure responsive element, said adjusting means comprising a screw jack, a reversible electric motor to which said screw jack is connected, a rotary limit switch for interrupting the operation of said motor, means including said limit switch for energizing said motor for uninterrupted operation of said screw jack in one direction; and means including said limit switch and a circuit interrupter for intermittent energization of said motor in the other direction of operation.

8. Mechanism for controlling the pressure in an aircraft cabin, comprising: a valve for controlling the pressure within the cabin; walls forming a control pressure chamber connected with a source of higher pressure, one of said walls comprising a movable diaphragm responding to variations in the differential between control chamber pressure and cabin pressure, said diaphragm being operable to control said valve; a pressure responsive element for controlling the control chamber pressure and thus affecting the operation of said valve in at least one range of operation of the mechanism, said pressure responsive element including a movable wall subjected on one side to control chamber pressure and subjected on the other side to ambient atmospheric pressure; a spring for loading said pressure responsive element; means for changing the loading of said spring; a reversible electric motor for driving said spring tension changing means; and means including a limit switch also driven by said motor, for energizing said motor in opposite directions, said limit switch functioning to interrupt the operation of said motor at predetermined limits of response of said pressure responsive element.

9. Mechanism for controlling the pressure in an aircraft cabin, comprising: a valve for controlling the pressure within the cabin; walls forming a control pressure chamber receiving air from a source of higher pressure; a diaphragm for controlling said valve, said diaphragm being subjected on one side to control chamber pressure and being subjected on the other side to cabin pressure, a pressure responsive element for controlling said control chamber pressure and thus affecting the operation of said valve in at least one range of operation of the mechanism, said pressure responsive element functioning in response to the differential between control chamber pressure and ambient atmospheric pressure; a spring for loading said pressure responsive element; means for changing the loading of said spring; a reversible electric motor for driving said spring tension changing means; means including a limit switch for energizing said motor for operation in both directions, with said limit switch functioning to interrupt the operation of the motor at predetermined limits of response of said pressure responsive element; and means including a circuit interrupter and a motor energized through said limit switch and driving said circuit interrupter for intermittently interrupting the energization of said reversible motor in one direction of operation thereof.

10. Control mechanism as defined in claim 7, wherein said circuit interrupter comprises a brush and a rotatable member having a surface comprising insulating and conducting portions arranged to alternately engage said brush in a rotary path, said conducting surfaces being of varying width in a direction transverse to said rotary path, and said brush being adjustable in said transverse direction so as to vary the ratio between the periods of circuit energization and circuit interruption.

11. In a pressurized aircraft cabin provided with an outlet having a valve for controllable escape of air from the cabin so as to control the pressure within the cabin; walls forming a control pressure chamber having a connection with a source of higher pressure, one of said walls comprising pressure responsive means for operating said valve, said pressure responsive means being operable by the differential between control chamber pressure and cabin pressure; a pressure responsive control element for controlling the pressure in the control chamber and thus affecting the actuation of said pressure responsive means, said pressure responsive control element being responsive to the differential between the pressure in said control chamber and ambient pressure; means for adjusting the response of said control element; a reversible electric motor for operating said adjusting means in opposite directions; and means including a manually operable starting switch and a limit switch driven from said electric motor, for energizing said electric motor, said limit switch functioning to interrupt the energization of said motor at predetermined limits of response of said control element.

12. Mechanism for controlling the pressure within an aircraft cabin, comprising: a valve for controlling the cabin pressure; walls forming a control pressure chamber connected with a source of higher pressure, one of said walls comprising a diaphragm for controlling said valve and responding to variations in the pressure differential between the pressure in the control chamber and cabin pressure; an element absolutely responsive to a control chamber pressure for controlling said control chamber pressure and hence the operation of said valve throughout an isobaric range; a control element responsive to a differential between ambient atmospheric pressure and control chamber pressure for maintaining a differential between said control chamber pressure and hence cabin pressure, and ambient atmospheric pressure, in a range above said isobaric range; reversible electric motor means for adjusting said differential control element from low to high and from high to low limits of differential control; means for automatically interrupting the operation of said actuating means at the respective limits; and manually operable means for initiating the operation of said actuating means selectively toward either the high or the low limit.

13. Mechanism for controlling the pressure within an aircraft cabin, comprising: a valve for controlling the pressure in the cabin; means defining a control chamber, one wall of which comprises a pressure responsive element connected to said valve for operating the same in response to changes in differential between the pressure in said chamber, acting against one side of said element and substantially cabin pressure acting against the other side of said element, said chamber defining means for bleeding of cabin air into said chamber; means for controlling the pressure in said chamber including a pilot valve providing for controlled escape of air from said chamber to ambient atmosphere and a pressure responsive element for controlling said pilot valve, said pressure responsive element being subjected to control chamber pressure and ambient pressure; a spring having one end connected to said valve and pressure responsive element for loading the same in one direction of valve movement; adjusting means connected to the other end of said spring and adapted to vary the loading of said spring so as to vary the response of said pressure responsive element, said adjusting means comprising a screw jack and a reversible electric motor for operating said jack screw in opposite directions so as to load and unload said spring; and a rotary limit switch connected to said jack screw and adapted to interrupt the operation of said electric motor at predetermined limits of response of said pressure responsive element.

14. Mechanism for controlling the pressure in an enclosure including: enclosure pressure control means operable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including means responsive to the differential between ambient pressure and the pressure in said control chamber for maintaining a pressure in said chamber at a selected differential between the pressure therein and ambient pressure; means for adjusting said pressure control means so as to change the differential between high and low limits; driving means for operating said adjusting means; and control means for said driving means providing for rapid operation thereof in the change from high to low differential and delayed operation thereof in the change from low to high differential.

15. Mechanism for controlling the pressure in an encolsure including: enclosure pressure control means cperable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including a differential pressure responsive device, responsive to the differential between ambient pressure and control chamber pressure for maintaining a pressure in said control chamber at a differential with respect to ambient pressure and to thus maintain a pressure in said enclosure which is at a pressure differential with respect to said ambient pressure; adjusting means for effecting adjustment of said pressure control means so as to change the differential from a high to a low limit and vice versa; means for operating said adjusting means to change said pressure control means from the high to the low differential limit; and a second means for operating said adjusting means to change said pressure control means from the low to the high differential limit.

16. Mechanism for controlling the pressure in an enclosure including: enclosure pressure control means operable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including a differential pressure responsive device having a movable part responsive to a differential between ambient pressure and control chamber pressure for maintaining a differential between control chamber pressure, and ambient pressure, means for adjusting said pressure control means for changing said differential; a reversible electric motor for driving said adjusting means; a limit switch adapted to interrupt the operation of said motor at high and low differential limits respectively; means including said limit switch for energizing said motor for operation from high to low differential limits; and a second means including said limit switch for energizing said motor for adjustment from low to high differential limits.

17. Mechanism for controlling the pressure in an enclosure including: enclosure pressure control means operable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including a differential pressure responsive device having a movable part responsive to a differential between ambient pressure and control chamber pressure for maintaining a differential between control chamber pressure and ambient pressure, means for adjusting said differential pressure responsive device for changing the differential; a reversible electric motor for driving said adjusting means; a limit switch also driven by said motor and adapted to interrupt the operation thereof at high and low differential limits respectively; means including said limit switch for uninterrupted energization of said motor for adjustment from high to low differential; and means including said limit switch and a circuit interrupting means for intermittent energization of said motor for slower adjustment from low to high differential.

18. Mechanism for controlling the pressure in an enclosure including: enclosure pressure control means operable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including a differential pressure responsive device responsive to a differential between ambient pressure and control chamber pressure for maintaining a differential between control chamber pressure and ambient pressure; means for adjusting said differential pressure responsive device for changing the differential; an electric motor for driving said adjusting means; a limit switch adapted to interrupt the operation thereof at high and low differential limits respectively; and means for adjusting said limit switch in a manner to vary at least one of the differential limits.

19. Mechanism for controlling the pressure in an enclosure including: enclosure pressure control means operable to control the pressure in said enclosure, said pressure control means including a pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including a pressure responsive element responsive to variations in the differential between control chamber pressure and ambient pressure for controlling the pressure in said control chamber; and means for changing the response of said pressure control means, said means comprising a jack screw, a reversible electric motor for driving the jack screw in opposite directions, and a rotary limit switch operatively connected to said jack screw and functioning to interrupt the operation of said motor at a predetermined limit.

20. Mechanism for controlling the pressure in an enclosure including: enclosure pressure control means operable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including a pressure responsive element responsive to the differential between chamber pressure and ambient pressure, for controlling the control chamber pressure; means for adjusting the response of said pressure control means, said adjusting means comprising a screw jack, a reversible electric motor to which said screw jack is connected, a rotary limit switch for interrupting the operation of said motor, means including said limit switch for energizing said motor for uninterrupted operation of said screw jack in one direction; and means including said limit switch and a circuit interrupter for intermittent energization of said motor in the other direction of operation.

21. Mechanism for controlling the pressure in an enclosure including: cabin pressure control means operable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including a pressure responsive element for controlling said control chamber pressure, said pressure responsive element functioning in response to the differential between control chamber pressure and ambient pressure; a spring for loading said pressure responsive element; means for changing the loading of said spring; a reversible electric motor for driving said spring load changing means; means including a limit switch for energizing said motor for operation in either direction, with said limit switch functioning to interrupt the operation of the motor at predetermined limits of response of said pressure responsive element; and means including a circuit interrupter and a motor energized through said limit switch and driving said circuit interrupter for intermittently interrupting the energization of said reversible motor in one direction of operation thereof.

22. Mechanism for controlling the pressure in an enclosure including: enclosure pressure control means operable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; pressure control means for said control chamber including differential responsive means responsive to a differential between ambient pressure and control chamber pressure for maintaining a differential between said control chamber and ambient pressure; reversible adjusting means for adjusting said differential responsive means from low to high and from high to low limits of differential pressure control; means for automatically interrupting the operation of said adjusting means at the respective limits; and manually operable means for initiating the operation of said adjusting means selectively toward either the high or the low limit.

23. Mechanism for controlling the pressure in an enclosure including: enclosure pressure control means operable to control the pressure in said cabin, said pressure control means including a pressure sensitive element; a control chamber, said pressure sensitive element being exposed on one side of enclosure pressure and on the other side to control chamber pressure in such a manner that changes in either of said pressures cause a movement of said pressure sensitive element whereby said enclosure pressure control means is operated to control said enclosure pressure; pressure control means for said control chamber, including means responsive to the differential between ambient pressure and the pressure in said control chamber and having a high differential position and a low differential position for maintaining the pressure in said chamber at respective high and low differentials with respect to ambient pressure in accordance with said positions; adjusting means for adjusting said differential responsive means toward either its high or low differential position; and means for stopping the adjustment when either of said positions is reached.

24. Mechanism for controlling the air pressure in an enclosure including: enclosure pressure control means operable to control the pressure in said enclosure, said pressure control means including a pressure sensitive element; a control chamber, said pressure sensitive element being exposed both to enclosure pressure and control chamber pressure; a pressure responsive control element, responsive to the differential between the pressure in said control chamber and ambient pressure, for controlling the pressure in the control chamber and thus effecting the actuation of said pressure responsive means; means for adjusting the response of said control element; a reversible electric motor for operating said adjusting means in opposite directions; and means including a manually operable starting switch and a limit switch driven from said electric motor, said limit switch functioning to interrupt the energization of said motor at predetermined limits of response of said control element.

25. In mechanism for controlling the pressure in an enclosure: walls defining a control pressure chamber; a movable pressure sensitive control element subjected on one side to enclosure pressure and on the other side to control chamber pressure; pressure control means for said control chamber including pressure responsive means having one side subjected to chamber pressure for controlling said chamber pressure; adjusting means for adjusting the response of said pressure responsive means; operating means for said adjusting means including a preselecting means for selecting one adjusted position for said pressure responsive means; a second operating means for said adjusting means including a preselecting means for selecting another adjusted position for said pressure responsive means; and means for causing either of said operating means to operate said adjusting means.

26. In mechanism for controlling the pressure in an enclosure: walls defining a control pressure chamber; a movable pressure sensitive control element subjected on one side to enclosure pressure and on the other side to control chamber pressure; pressure control means for said control chamber including pressure responsive means having one side subjected to chamber pressure for controlling said chamber pressure; adjusting means for adjusting the response of said pressure responsive means; operating means for said adjusting means; first control means for said operating means including preselecting means for preselecting a position to which said adjusting means is to be adjusted; a second control means including a preselecting means for preselecting another position to which said adjusting means is to be adjusted; and means for causing either of said control means to control the operation of said operating means.

JAMES M. KEMPER.

REFERENCES CITED

The following references are of record in the file of this patent:

UNITED STATES PATENTS

| Number | Name | Date |
| --- | --- | --- |
| 2,208,554 | Price | July 16, 1940 |
| 2,316,416 | Gregg | Apr. 13, 1943 |
| 2,391,197 | Schwein | Dec. 18, 1945 |
| 2,399,326 | Crot | Apr. 30, 1946 |
| 2,402,681 | Schroeder | June 25, 1946 |
| 2,419,707 | Cooper et al. | Apr. 29, 1947 |
| 2,424,491 | Morris | July 22, 1947 |

FOREIGN PATENTS

| Number | Country | Date |
| --- | --- | --- |
| 521,623 | Great Britain | May 27, 1940 |
| 563,553 | Great Britain | Aug. 21, 1944 |